(12) United States Patent
Kolatschek

(10) Patent No.: US 7,701,221 B2
(45) Date of Patent: Apr. 20, 2010

(54) DEVICE FOR ENVIRONMENT DETECTION

(75) Inventor: Josef Kolatschek, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 773 days.

(21) Appl. No.: 10/571,166

(22) PCT Filed: Jul. 22, 2004

(86) PCT No.: PCT/DE2004/001620

§ 371 (c)(1), (2), (4) Date: Jan. 8, 2007

(87) PCT Pub. No.: WO2005/026777

PCT Pub. Date: Mar. 24, 2005

(65) Prior Publication Data

US 2007/0152663 A1  Jul. 5, 2007

(30) Foreign Application Priority Data

Sep. 11, 2003  (DE) ............................... 103 42 045

(51) Int. Cl.
*G01V 3/02* (2006.01)
*G01V 3/08* (2006.01)
*G01R 33/00* (2006.01)

(52) U.S. Cl. ..................................... 324/329; 324/326
(58) Field of Classification Search ................ 324/326, 324/329, 332, 334–337, 344–345, 354, 357–362
See application file for complete search history.

(56) References Cited

U.S. PATENT DOCUMENTS 4,232,286 A  11/1980  Voll

FOREIGN PATENT DOCUMENTS

| DE | 28 23 096 | 11/1979 |
|---|---|---|
| DE | 100 45 697 | 3/2002 |
| GB | 2 021 781 | 12/1979 |
| GB | 2 232 518 | 12/1990 |
| JP | 2000098049 | 4/2000 |
| WO | WO 01/15109 | 3/2001 |
| WO | WO 03056353 A2 * | 7/2003 |

* cited by examiner

*Primary Examiner*—Bot L LeDynh
(74) *Attorney, Agent, or Firm*—Kenyon & Kenyon LLP

(57) ABSTRACT

A device for environment detection having a first magnetic alternating field is situated in a vehicle. The device detects the at least one object in the environment of the vehicle by a second magnetic alternating field which is produced in the object as a function of the first magnetic alternating field.

20 Claims, 2 Drawing Sheets

DEVICE FOR ENVIRONMENT DETECTION

BACKGROUND INFORMATION

PCT International Publication No. WO 01/15109 describes a magnetic sensor, in which a generated primary magnetic field is changed by an object and this change is measured. The magnitude of the changes depends on the magnetic properties of the object, that is, whether they are paramagnetic, diamagnetic or ferromagnetic properties. These properties are characterized by magnetic susceptibility and permeability. This is because of the magnetic behavior and the inner structure of the electron shell of the existing atoms and molecules. Thus the subject matter of this application is a measuring device, in which the primary magnetic field is influenced.

The disadvantage of this is that the measurement of the attenuation of the primary variable magnetic field is sensitive to interference effects and that there is no possibility for measuring the distance to the object.

SUMMARY OF THE INVENTION

The device according to the present invention for environment detection having a first magnetic alternating field has the advantage that now a measurement of the distance from the vehicle to the object is possible, that a precise conclusion regarding the kind and quality of the object can be drawn, that a cost-effective technology is being used, namely eddy current measurement, and that there is a high insensitivity with respect to a surface quality or an aspect angle of the object. In particular, it is therefore possible to distinguish between pedestrians and other obstacles. For this purpose, an exclusive measurement of a second magnetic alternating field is used, which is generated by induced eddy currents of the first magnetic alternating field. This second magnetic alternating field depends on electrical properties of the object and not on the magnetic susceptibility and permeability. The decisive variable for this purpose is the conductivity of the object.

Especially advantageous is the fact that the device has at least one receiving device for receiving the second magnetic alternating field, that is, the one that was formed by the eddy current effect. This at least one receiving device is insulated from the first magnetic alternating field. The insulation may be achieved by an appropriate spacing such that the first magnetic alternating field is no longer measurable at the location of the receiving device or by suitable filters, which are either electrically implemented or are magnetic, that is, for example, by a magnetic wall.

For measuring the distance, a phase shift between the first and the second magnetic alternating field is evaluated. The amplitude of the second magnetic alternating field is used to characterize the conductivity of the at least one object since the second magnetic alternating field, as explained above, is generated as a function of the conductivity of the object. The influence of the conductivity is in particular expressed in the amplitude. Due to the separate measurement of the distance from the object, the effect of the attenuation in the amplitude may be taken into account so as then to determine the conductivity from it. The conductivity is used to classify the object, stored conductivities for typical objects such as pedestrians, other vehicles or a wall of a house or a tree being used for comparison. The evaluation of the change of the distance over time makes it possible to determine a relative speed between the vehicle and the object. This information in particular as well as the classification of the object can be supplied to a restraint system in order to undertake precrash measures or other measures in preparation for a crash as a function of these analyses. This may also be used to influence a triggering algorithm. The precrash measures include, for example, the activation of reversible restraint means such as belt tensioners.

The device may be used in specific locations in the vehicle, for example only at the front of the vehicle, or at the sides of the vehicle or in the rear of the vehicle. However, it may also be located at all or several of these locations. In particular, the device may also be used in combination with other surround sensors in order to generate plausibilization data.

DETAILED DESCRIPTION

Decisive for the protective effect of passenger protective devices in motor vehicles is the accurately timed triggering of passenger restraint means. The triggering usually occurs by evaluating acceleration sensor signals which are determined in the vehicle itself in the event of a crash into an obstacle. Indirectly, by evaluating these sensor signals, an inference is also made to the kind of obstacle. This information then enters the manner in which the protective device is triggered. The obstacle in this context may be another vehicle or a barrier having a rigid or a yielding structure or else a pedestrian. In the latter case, protective devices are activated as well, which can reduce the severity of the pedestrian's injury. If in the precrash phase data is already available regarding the object, with which a collision is to be expected, such as information regarding the distance, relative speed and quality, then it is possible to trigger the existing protective means accordingly with improved temporal coordination and improved adaptation to the type of obstacle. An improved protective action may thereby be achieved for the passengers and, if applicable, for the pedestrian. Normally, distance and speed sensors based on active microwave radiation, that is, radar, are used for precrash obstacle detection. These are usually situated at the front of a vehicle.

The present invention now provides for the use of a more favorable and improved device for environment detection with the aid of eddy current measurement. For this purpose, a transmitter in the vehicle generates a first magnetic alternating field, which generates a second magnetic alternating field in possible objects in the environment of the vehicle via eddy currents. This second magnetic alternating field depends only on the object's electrical properties such as the conductivity. The receiving device, it also being possible for multiple receiving devices to be provided in the vehicle, for this second magnetic alternating field does not see the first magnetic alternating field or the influence of the first alternating field is eliminated electrically or electronically. By comparing the phases of the first and second magnetic alternating field in an evaluation unit, for example in a processor associated with the device, it is possible to determine the distance between object and vehicle. By evaluating the amplitude of the second magnetic alternating field it is possible to infer the conductivity of the object and thus to classify the object. This can be facilitated in particular by comparisons with stored data.

Figure 1:
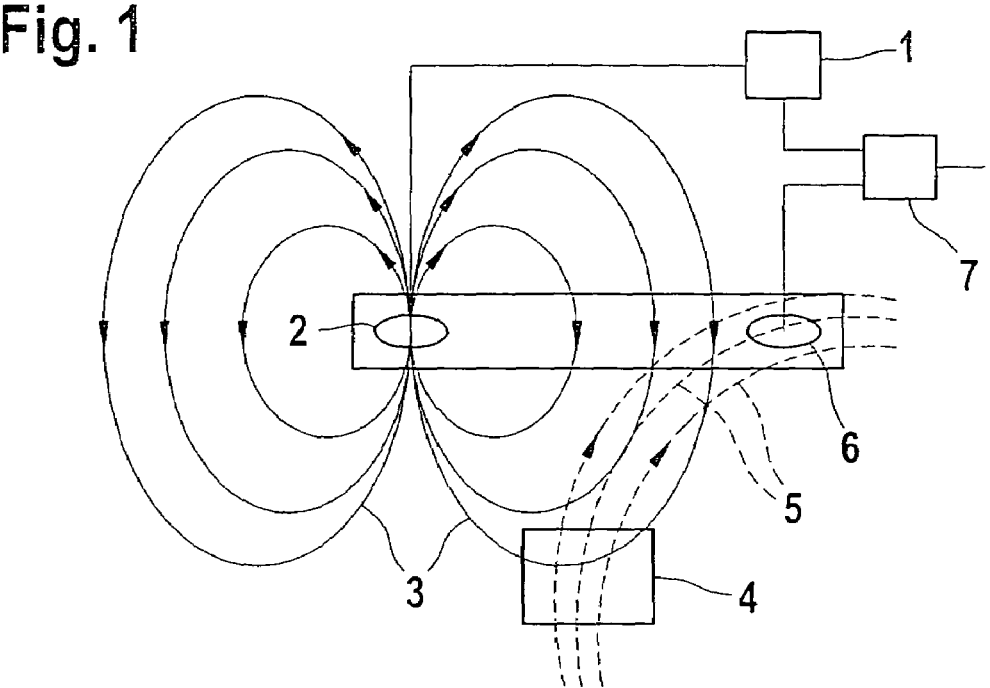
FIG. 1 shows block diagram of the device according to the present invention.

FIG. 1 shows the device according to the present invention in a block diagram. The device according to the present invention has a control unit 1 and a transmitting coil 2 as a transmitter, transmitting coil 2 generating a high-frequency, primary magnetic alternating field. The first magnetic alternating field 3 induces eddy currents in a nearby object 4. These eddy currents in turn generate a second magnetic alternating field 5, which can be sensed by a receiving coil 6, which is located at a suitable distance with respect to transmitting coil 2. Receiving coil 6 is set apart from transmitting coil 2 such that first magnetic alternating field 3 cannot be received by receiving coil 6. Additionally or alternatively it is possible to use filters, which are either electric, electronic or magnetic, to eliminate the influence of the first magnetic alternating field on receiving coil 6 or the subsequent evaluation. Receiving coil 6 is connected to an evaluation unit 7, which is likewise connected to control unit 1. Evaluation unit 7 is able to evaluate the amplitude of the second magnetic alternating field as well as the phase shift of the second with respect to the first magnetic alternating field. From the determination of the phase shift it is possible to draw conclusions regarding the distance between the vehicle and the object. By taking the previously determined distance with respect to object 4 into account, the amplitude of the second magnetic alternating field makes it possible to draw conclusions regarding the nature of the object since the induced eddy current and thus also the measured amplitude of the second magnetic alternating field are directly proportional to the distance and the conductivity of the object.

The evaluation of the change of the distance information over a specified time interval allows for additional conclusions regarding the relative speed of object 4. By comparing the conductivity of object 4 determined by measurement with a catalog of conductivities associated with objects it is possible to specify the conclusions regarding the nature of the object more precisely, e.g. as to whether it is a vehicle, a wooden wall or a pedestrian.

For the sake of simplicity, the electrical and electronic components required for generating the primary magnetic alternating field and for preprocessing the secondary magnetic alternating field such that evaluation unit 7 is able to evaluate it have been omitted here. Required for this purpose are an oscillator for the generation and possibly a frequency converter and, in the case of the receiving coil, filters, a digitizer having counters and amplifiers.

Figure 2:
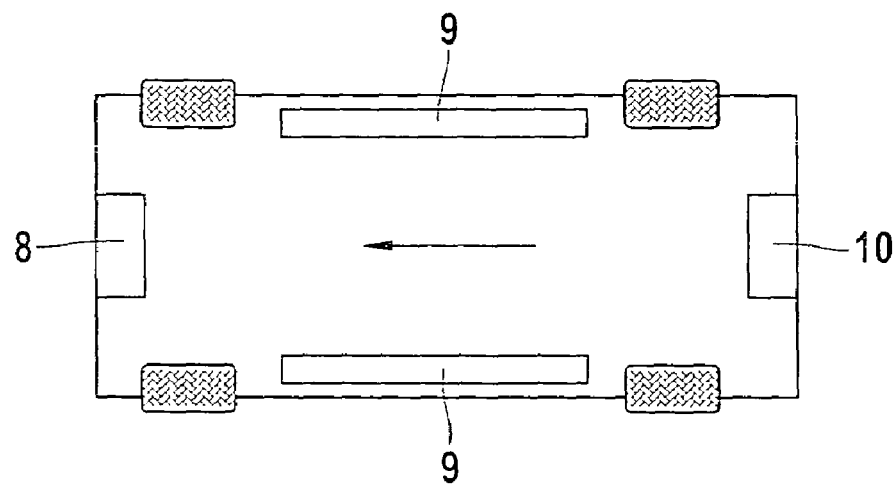
FIG. 2 shows installation locations of the device of the present invention in the vehicle.

FIG. 2 shows by way of example at what locations on the vehicle the device according to the present invention may be situated. For this purpose, the front 8 of the vehicle, for example the bumper, may be used or the sides 9 of the vehicle or the rear section 10. If all of these locations 8, 9 and 10 are used, then it is possible to detect objects throughout the entire environment of the vehicle.

Figure 3:
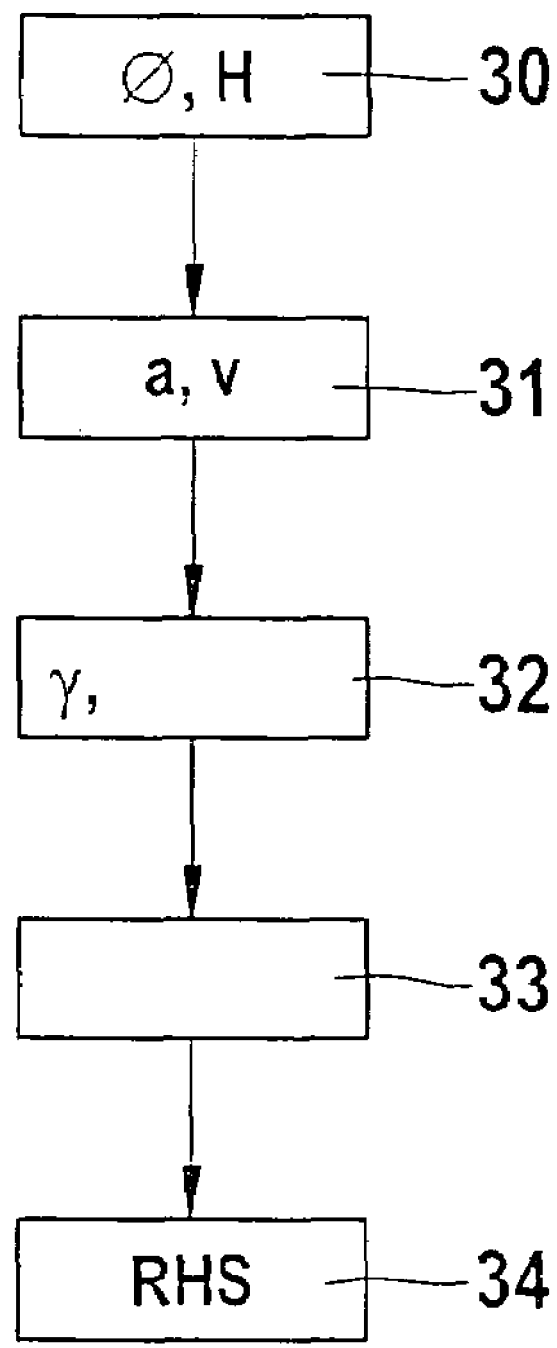
FIG. 3 shows a flow chart for evaluating the data received by the device of the present invention.

In a flow chart, FIG. 3 shows how the data, which are ascertained by the second magnetic alternating field, are evaluated. This evaluation may be performed in evaluation unit 7, which is for example directly assigned to the device, or in a control unit in the vehicle, for example in the control unit for restraint systems. By comparing the phases of the first and the second magnetic alternating field, method step 30 on the one hand determines the phase difference, from which then the distance may be determined. The amplitude of the received second magnetic alternating field, however, is also ascertained in method step 30. In method step 31 then the distance is determined from the phase and, over a larger time interval, the relative speed between object 4 and the vehicle is determined from the change of the distance. In method step 32, conductivity 7 is determined from amplitude h by taking into account the distance between object 4 and the vehicle and, using the conductivity, the object is classified by comparing the stored conductivities for typical objects. In method step 33 then the object is determined, from which then in method step 34, if indicated, appropriate restraint means and the entire restraint system are influenced. The influencing may already begin in the algorithm so as to switch it to a higher sensitivity for example, that is, to lower a triggering threshold, and specifically to trigger appropriate restraint means also for protecting a pedestrian. If multiple receiving devices are used, then it is also possible to determine the location of object 4 precisely.

What is claimed is:

1. A device for environment detection having a first magnetic alternating field, the device being situated in a vehicle, the device comprising:

an arrangement for detecting at least one object in an environment of the vehicle using a second magnetic alternating field, which is produced in the at least one object by the first magnetic alternating field;

means for determining a distance between the vehicle and the at least one object from a phase shift between the first and the second magnetic alternating fields; and means for determining a relative speed between the vehicle and the at least one object as a function of a change of the distance over time.

2. The device according to claim 1, further comprising at least one receiving device for the second magnetic alternating field, which is insulated from the first magnetic alternating field.

3. The device according to claim 1, further comprising means for classifying the at least one object as a function of an amplitude of the second magnetic alternating field.

4. A device for environment detection having a first magnetic alternating field, the device being situated in a vehicle, the device comprising:

an arrangement for detecting at least one object in an environment of the vehicle using a second magnetic alternating field, which is produced in the at least one object by the first magnetic alternating field;

means for classifying the at least one object as a function of an amplitude of the second magnetic alternating field; and means for determining a conductivity of the at least one object as a function of the amplitude, the object being classified by the conductivity.

5. The device according to claim 4, further comprising means for determining a distance between the vehicle and the at least one object from a phase shift between the first and the second magnetic alternating fields.

6. The device according to claim 2, further comprising at least one transmitter, and wherein the at least one receiving device is insulated by being set apart from the at least one transmitter for the first magnetic alternating field.

7. A device for environment detection having a first magnetic alternating field, the device being situated in a vehicle, the device comprising:

an arrangement for detecting at least one object in an environment of the vehicle using a second magnetic alternating field, which is produced in the at least one object by the first magnetic alternating field;

at least one receiving device for the second magnetic alternating field, which is insulated from the first magnetic alternating field;

at least one transmitter, and wherein the at least one receiving device is insulated by being set apart from the at least one transmitter for the first magnetic alternating field; and at least one filter for insulating the at least one receiving device from the at least one transmitter.

8. The device according to claim 7, wherein the at least one filter is an electronic filter.

9. The device according to claim 7, wherein the at least one filter is a magnetic filter.

10. The device according to claim 1, wherein the device is situated in a front of the vehicle.

11. The device according to claim 1, wherein the device is situated in a front bumper of the vehicle.

12. The device according to claim 1, wherein the device is situated in sides of the vehicle.

13. The device according to claim 1, wherein the device is situated in a rear of the vehicle.

14. The device according to claim 4, wherein the device is situated in a front of the vehicle.

15. The device according to claim 4, wherein the device is situated in a front bumper of the vehicle.

16. The device according to claim 4, wherein the device is situated in sides of the vehicle.

17. The device according to claim 4, wherein the device is situated in a rear of the vehicle.

18. The device according to claim 7, wherein the device is situated in a front of the vehicle.

19. The device according to claim 7, wherein the device is situated in sides of the vehicle.

20. The device according to claim 7, wherein the device is situated in a rear of the vehicle.

\* \* \* \* \*